United States Patent [19]

Sanada

[11] 3,904,279
[45] Sept. 9, 1975

[54] INTERCHANGEABLE LENS FOR A CAMERA

[75] Inventor: Noriaki Sanada, Yokohama, Japan

[73] Assignee: Canon Kabushiki Kaisha, Tokyo, Japan

[22] Filed: Apr. 23, 1974

[21] Appl. No.: 463,245

[30] Foreign Application Priority Data
May 7, 1973   Japan.............................. 48-50904

[52] U.S. Cl. ................. 350/257; 354/202; 354/286
[51] Int. Cl.² ........................................... G02B 7/02
[58] Field of Search ............ D61/1 E; 350/252, 255, 350/254, 257; 354/202, 286

[56] References Cited
FOREIGN PATENTS OR APPLICATIONS
1,188,586   4/1970   United Kingdom................. 350/252

OTHER PUBLICATIONS

Photography, July 1972, p. 623.

Modern Photography, May 1973, p. 11.

Primary Examiner—Ronald L. Wibert
Assistant Examiner—F. L. Evans
Attorney, Agent, or Firm—William R. Woodward

[57]   ABSTRACT

An interchangeable lens for a camera includes a rotatable adjust member for focusing or zooming. The adjust member is covered with a flexible cover provided with knurling. The cover is provided with embossed display indicia for permitting the type of the lens such as focal length and/or f-number to be identified either by sight or by touch.

3 Claims, 5 Drawing Figures

PATENTED SEP 9 1975　　　　　　　　3,904,279
FIG. 1
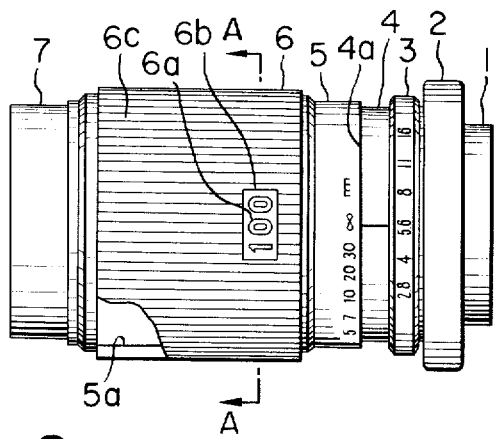
FIG. 2　　　FIG. 3
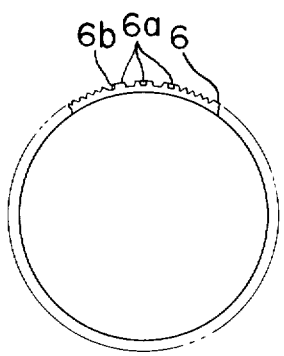 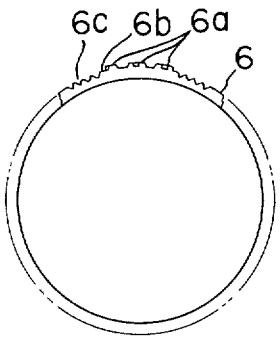
FIG. 4　　　FIG. 5
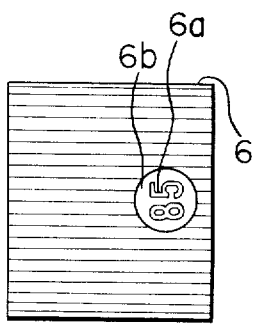 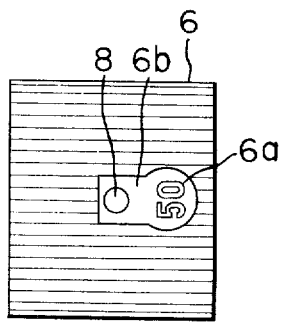

INTERCHANGEABLE LENS FOR A CAMERA

BACKGROUND OF THE INVENTION

1. Field of the Invention

This invention relates to the display, particularly of the focal length of an interchangeable lens, on the barrel of such lens.

2. Description of the Prior Art

In the lens barrels of the prior art, it is well known that some indicia representing the focal length of the lens itself are formed, by engraving or printing, on a part of the lens barrel, for example, on the keep ring for the front lens component or on the aperture adjust ring.

However, the recent systematization or diversification of the camera function has expanded the versatility of the camera on the part of the user, which in turn has required interchangeable lenses to have correspondingly various focal lengths. This has also augmented the types of interchangeable lenses to such an extent as can meet the user's demand. On the other hand, however, these various interchangeable lenses are very similar to one another in size and configuration because they are designed as a system and adapted for use with the same standard of accessories such as flash system filters, hoods, caps and the like to facilitate the use of the lenses. This has made it difficult for the user to identify a focal length at a glance over the display indicia of the above-described type. This would particularly offer problems in cases where lens interchange is to be quickly done from among several interchangeable lenses contained in a bag or like container, and it might be possible for professional photographers to miss shooting chances.

SUMMARY OF THE INVENTION

It is therefore an object of the present invention to provide an interchangeable lens barrel which enables the focal length of the interchangeable lens to be definitely identified by either of sight or feel.

To achieve such object, the interchangeable lens of the present invention comprises a stationary portion detachably secured to a camera and holding a lens frame for movement therewithin. An adjust member is rotatably mounted around the stationary portion. The adjust member has a surface formed with anti-slip means for manual operation. The surface is provided thereon with display indicia which permits the type of the lens to be identified by either of sight and feel. The adjust member is covered with a flexible cover. The surface of the cover is formed with embossed display indicia for permitting the type of the lens to be identified.

The invention will become fully apparent from the following detailed description of some embodiments thereof taken in conjunction with the accompanying drawings.

BRIEF DESCRIPTION OF THE DRAWINGS

FIG. 1 is a plan view of the interchangeable lens according to an embodiment of the present invention.

FIG. 2 is a cross-sectional view taken along line A—A of FIG. 1 and showing a cover ring alone.

FIG. 3 is a view similar to FIG. 2 but showing another form of the cover ring.

FIG. 4 and 5 are plan views showing further forms of the cover ring.

DESCRIPTION OF THE PREFERRED EMBODIMENTS

Referring to the drawings, the interchangeable lens according to the present invention includes a mount portion 1 to be mounted to a camera body (not shown) and serving to secure the interchangeable lens to the camera body by means of a fastening ring 2. An aperture adjust ring, designated by reference numeral 3, is rotatably mounted around a stationary portion 4 holding a lens frame, an aperture mechanism, etc. for movement therewithin. The stationary portion 4 is provided with an index 4a for aperture and distance scales. A distance adjust ring 5 is also rotatably mounted around the stationary portion 4. A cover ring 6 formed of flexible rubber or plastic material is fitted in a stepped portion 5a formed in the distance ring 5, and there are integrally formed on the cover ring some essential portions of the present invention which are focal length display indicia 6a, flat portions 6b and anti-slip knurling 6c. A front frame 7 having threads (not shown) for threadably receiving a filter is designed for or against rotation with the distance ring 5 and for axial movement.

With the above-described construction, when the cover ring 6 is manually gripped and rotated in any desired direction, the distance ring 5 integral therewith is also rotated in the same direction so that the lens frame is moved within the stationary portion 4 in a conventional manner to accomplish a predetermined distance adjustment. In this case, the knurling 6c is useful to prevent slippage of the user's hand.

Description will now be made particularly of the cover ring 6 which forms the essential part of the present invention. In order to enable the focal length display indicia 6a of the interchangeable lens to be definitely identified by sight or by feel alone, it is desirable that the configuration and size of the focal length display indicia 6a be set so as not to spoil the aesthetic effect of its appearance and that such indicia be provided at a plurality of locations on the outer circumference of the cover ring 6. This is because such indicia, if provided only at one location, would become unseen to the user when the distance ring 5 has been angularly rotated. Further, the surface of the indicia 6a or the flat portions 6b may effectively be colored to assist in the visual identification.

In addition to the enhancement of the visual identification, to enable the identification to be done by feel along, the flat portion 6b may be formed in a part of the knurling 6c and the indicia 6a may be convex or embossed with respect to the flat portion, in the manner as shown.

If the identification is difficult with the indicia 6a alone, the flat portion 6b may take a circular or other suitable configuration, or alternatively, as shown in FIG. 5, may be formed with a projection or a depression or hole, as indicated at 8.

Although the focal length display indicia 6a have been shown as being embossed with respect to the flat portion 6b in the above-described embodiment, the indicia 6a may also be depressed with respect to the latter. As a further alternative, the focal length display indicia 6a may be formed so as to extend over the entire periphery of the cover ring 6 to thereby provide anti-slip means instead of the knurling. Also, if the distance ring 5 were shaped by molding, the cover ring 6, the focal length display indica 6a and the knurling 6c could be formed integrally and economically advantageously. The display indicia are not limited to the focal length but the f-number of the lens may additionally be displayed. Further, the cover ring may alternatively mounted on the zooming ring of a zoom lens.

It will thus be appreciated that the present invention is constructed to provide definite identification of interchangeable lenses by either of sight and feel and without increasing the manufacturing cost, and this leads to an excellent utility.

I claim:

1. An interchangeable lens for a camera which comprises in combination:

a stationary member detachably securable to a camera;

a lens frame movably held in said stationary member;

an adjustment ring rotatably mounted around said stationary member; and a cylindrical covering made of a flexible material fitted around the outer periphery of said adjustment ring, and having on the peripheral surface thereof an indicia formed in relief such as to identify the focal length of the interchangeable lens both by sight and touch.

2. The interchangeable lens according to claim 1, wherein said flexible cylindrical covering is provided on the outer peripheral surface thereof with a plurality of embossed indicias to identify the focal length of said interchangeable lens.

3. The interchangeable lens according to claim 1, wherein said flexible cylindrical covering is provided on the entire outer surface of said covering with embossed indicias to identify the focal length of said interchangeable lens, said embossed indicias also serving as anti-slip patterns.

* * * * *